March 22, 1960    E. LOHNERT    2,929,191
PICK-UP AND FEED MEANS FOR BALER
Filed Aug. 27, 1956    5 Sheets-Sheet 1

INVENTOR.
ERICH LOHNERT
BY
Joseph Allen Brown
ATTORNEY

March 22, 1960 E. LOHNERT 2,929,191
PICK-UP AND FEED MEANS FOR BALER
Filed Aug. 27, 1956 5 Sheets-Sheet 2

INVENTOR.
ERICH LOHNERT
BY
Joseph Allen Brown
ATTORNEY

March 22, 1960  E. LOHNERT  2,929,191
PICK-UP AND FEED MEANS FOR BALER
Filed Aug. 27, 1956  5 Sheets-Sheet 5

INVENTOR.
ERICH LOHNERT
BY
ATTORNEY

//www.united States Patent Office 2,929,191
Patented Mar. 22, 1960

2,929,191

PICK-UP AND FEED MEANS FOR BALER

Erich Lohnert, Frankfurt am Main, Germany, assignor to Sperry Rand Corporation, New Holland, Pa., a corporation of Delaware Application August 27, 1956, Serial No. 606,346

3 Claims. (Cl. 56—341)

The present invention relates generally to hay balers and more particularly to automatic hay balers of the so-called "straight-through" type.

In order to mechanize harvesting tasks, baling machines have heretofore been equipped with gathering and conveying means necessary to transport the material to be baled into the baling chamber. Such machines were equipped on both sides with seats so that during the compressing operation the bales could be tied by hand with wire. Later, when such machines were built lighter and equipped with self-tying mechanisms, they were not economical for normal farming operations due to their high initial cost. This situation still was not changed when the so-called high-density pick-up balers were equipped with conveying means to handle grass and silage, inasmuch as the possible uses of such balers are rather limited.

Baling presses up to now have been so designed that a pick-up is needed which will elevate the material to be baled to the height of the baling chamber. Additional feeding means is required to bring it from there to the baling chamber in order that it may be compressed thereafter in a well-known manner by a reciprocating baling plunger. This sequence of work, specifically from the gathering of the material in the field to the compression in the baling chamber, requires, therefore, a multiplicity of elements which complicates the design of such a machine and which, when handling very heavy material, as for instance, green grass or beet leaves, often leads to functional troubles.

Other harvesting machines have been designed which, by special pick-up means, lift material from a field, then elevate it with an elevator and convey it laterally by means of an auger. At the discharge end of the auger, the material is pushed into the bale chamber by a "horsehead" (wadboard). These machines are rather heavy and cumbersome in their design and, therefore, are primarily suited for use over flat terrain. A further disadvantage with such machines is that the material to be compressed is introduced into the baling chamber from the top and the auger can only advance the material as far as the edge of the baling chamber; as a consequence, the finished bale often has more material on the side toward the auger and takes on a somewhat bowed appearance. Moreover, with such machines green material is very difficult to handle inasmuch as the augers have a tendency to wrap and bind.

One object of this invention is to provide a hay baler of greatly simplified design.

Another object of this invention is to provide a low-density hay baler having means operable to both elevate material to a bale chamber and convey it into the chamber.

Another object of this invention is to provide a hay baler having a collector-feeder mechanism driven by a drive shaft which also serves to drive a crank for a plunger.

Another object of this invention is to provide a hay baler of the character described in which the plunger operation is synchronized with the operation of the collector-feeder, the plunger serving to strip material from the collector-feeder.

A further object of this invention is to provide a hay baler of the character described having a collector-feeder which delivers material upwardly and against a top wall of a bale chamber to provide bales of more uniform shape than was heretofore possible.

A still further object of this invention is to provide a baler adapted for the reception of an elevator to receive bales as they are delivered from the baler so that the bales may be conveyed onto a trailing wagon or the like.

Other objects of this invention will be apparent hereinafter from the specification and from the recital in the appended claims.

The present invention proposes a machine with a swinging plunger and a single conveying means transporting material to be handled from the field to the baling chamber in a direction opposite to the direction of travel. This construction eliminates disadvantages in machines of prior design. The conveying means is constructed as a rotating rake, whose driving shaft carries the crank for actuating the plunger. The drive transmission is interposed between the rotary collector-feeder and the crank. The rotary collector-feeder continuously delivers material against the top of the bale chamber, so that the bale chamber remains consistently filled and no material can fall back upon the ground. In accomplishing this, it is possible that the collector-feeder can be lowered to a point where it coacts with cutting means near the entrance of the bale chamber, depending on the consistency of the material.

Furthermore, a part of the bale chamber, with the needle shaft, needles, tension rails, and the bale chute, can be removed and replaced by an elevator to convey baled material onto a trailing wagon or the like; or, an elevator can be applied to the discharge end of the baler without removing any of the baler parts.

The tines of the rotating feeder are so shaped that with every stroke of the plunger they pass freely between the segments which constitute the body of the plunger.

By means of my new design, it is possible to furnish an economical machine for small farms, enabling such farms to afford mechanical harvesting. With this design, the collector-feeder brings material approximately to the height of the bale chamber where it is then stripped off the feeder near the lowest point of the baling chamber by the swinging plunger. From there, the plunger forces the material into the bale chamber from where it is then pushed rearwardly in a well-known manner.

Figure 1:
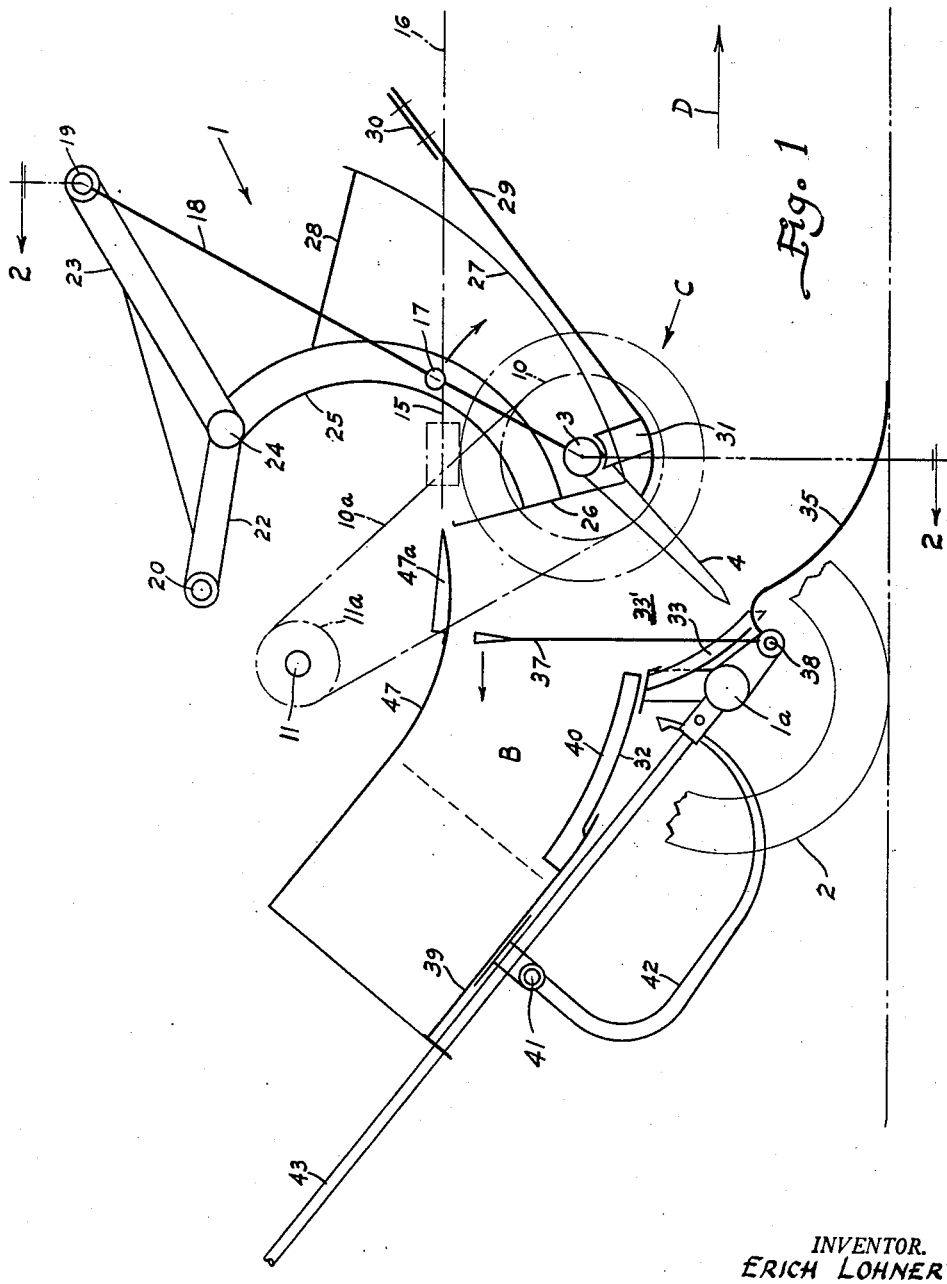
Fig. 1 is a diagrammatic side view of a baler constructed according to one embodiment of my invention.
Figure 2:
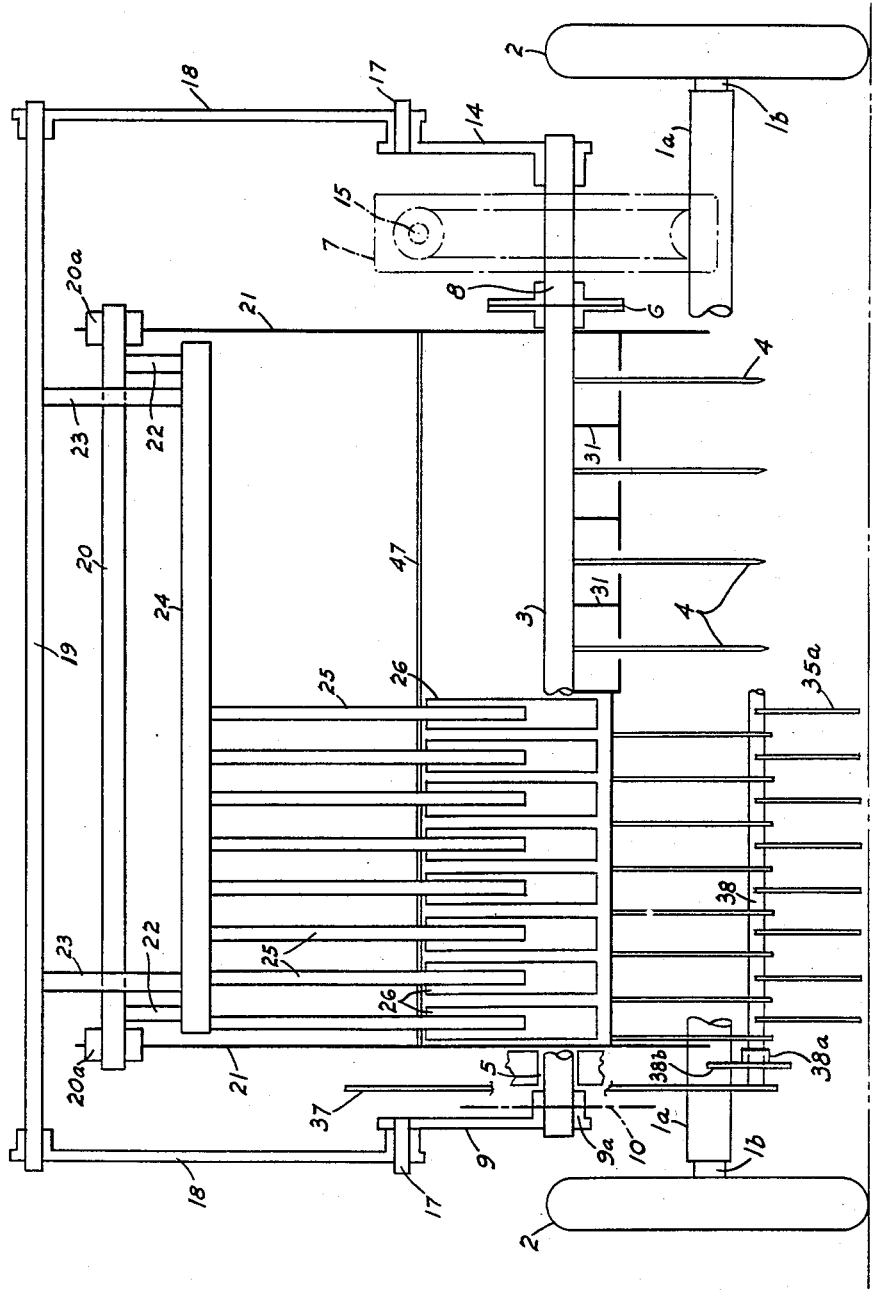
Fig. 2 is a diagrammatic section taken on the lines 2—2 of Fig. 1 and looking in the direction of the arrows.

Referring now to the drawings by numerals of reference, and particularly to Figs. 1 and 2, 1 denotes generally the baler of this invention which is adapted to be towed across a field behind a tractor to pick up crop material and form it into bales. The baler travels from left to right when viewed as shown in Fig. 1, and as indicated by the arrow D. Neither the tractor, nor the drawbar means between the tractor and the baler are shown, such structure being conventional.

The baler has a main axle 1a which supports a frame or housing 21 (Fig. 2). Axle 1a is itself supported by a pair of ground wheels 2—2 connected to the axle through stub-shafts 1b.

Positioned forwardly of main axle 1a is a single, combined collector-feeder C which both elevates material to the height of the bale chamber and conveys it rearwardly into the bale chamber, denoted B. The collector-feeder comprises a rotatable shaft 3 extending parallel to the main axle 1a and having a plurality of radially extending feed fingers 4. Shaft 3 is journaled at one end in a bearing 5 mounted in one side of frame 21. At its opposite end, shaft 3 extends through the adjacent side wall of frame 21 and is connected by means of a coupling 6 to an output drive shaft 8 of a worm-type gear box 7. The input worm-shaft of the gear box is designated 15, receiving its power through a universal shaft 16 connected to the P.T.O. of the tractor.

The end of shaft 3 adjacent bearing 5 has a crank 9 affixed to it. Crank 9 has a hub 9a which carries a sprocket 10 connectable through endless chain 10a to a sprocket 11a of a shaft 11 of a knotter mechanism of any desired conventional type (Fig. 1).

The end of shaft 8 protruding outwardly of gear box 7 on the side thereof opposite shaft 3 carries a crank 14. The respective cranks 9 and 14 are connected to crank pins 17 which are in turn connected by rods 18 to a cross shaft 19. Cross shaft 19 has radial arms 23 which are rigidly connected to a cross pipe 24. Cross pipe 24 is connected by radial arms 22 to a shaft 20 adapted to oscillate in bearings 20a affixed to frame 21. Cross pipe 24 has a plurality of arcuate radial arms 25, the outer ends of which carry a plunger in the form of laterally spaced head plates 26.

Welded or otherwise affixed to head plates 26 are arcuate guard members or plates 27 braced by members 28 to arms 25. Spaced resilient entry guides 29 extend between the sides of frame 21 being supported on a cross member 30 (Fig. 1). The head plates 26, arms 25, arcuate plates 27, and entry guides 29 are so disposed that the fingers 4 on the collector-feeder C are able to move freely through the plunger and these members during rotation.

The free ends of entry guides 29 carry supports 31 moveable into engagement with shaft 3 when the entry guides are sprung towards the shaft by material being fed into the baler. Supports 31 limit the upward swing of the guides.

The baling chamber B has a floor 32 provided with upwardly projecting fore-and-aft extending rails 40 and a top wall 47 provided with forwardly projecting spaced portions 47a. As shown in Figs. 1 and 3–5, there is a space between the rearward ends of guides 29, and the forward end of floor 32. Such space provides an opening in the bottom of baling chamber B through which material may be delivered upwardly toward top wall 47 and forwardly projecting portions 47a. Such opening is denoted 33' in Fig. 1. An arcuate floor 33 is carried on main axle 1a and extends concentrically relative to the axis of shaft 3 between the forward edge of floor 32 downwardly to the rear end of a stationary pick-up rake 35. Rake 35 comprises a plurality of rake tines 35a affixed to a shaft 38 journaled in bearings 38a (Fig. 2) carried on brackets 38b welded to main axle 1a and extending radially therefrom. Shaft 38 is rotatable by means of a lever 37 to position rake 35, selectively, either in down position as shown in Fig. 1 or in an up, transport position, not shown.

The baler has a rear floor portion 39 which carries a needle shaft 41, and needles 42, the needles being projectable through suitable openings in floor 32, and top wall 47 to deliver a bale tying medium to the knotter mechanism of the baler. The needles are adapted to be driven through conventional means, not shown, in timed relation to the knotter mechanism of the baler.

The baler may be provided with a chute 43 to receive the bales after they have been formed in chamber B and tied.

Figure 4:
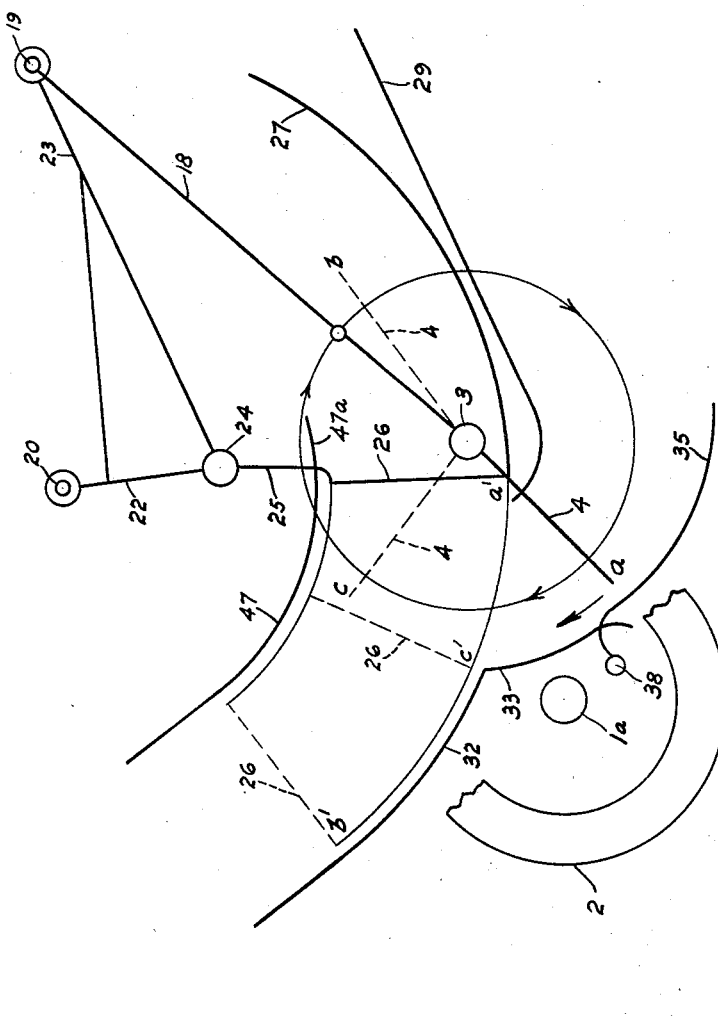
Fig. 4 is a schematic representation of the movements of the bale plunger in relation to the collector-feeder; and, Fig. 5 is a diagrammatic view similar to Fig. 1 showing elevator means provided in place of the bale chute.

In operation, the rake tines 35a engage material on the ground as the baler is traversed across a field and elevate it to a point where the constantly rotating collector-feeder C, rotating clockwise (Fig. 1), picks the hay from the rake and feeds it upwardly and rearwardly toward top wall 47 and projecting portions 47a of the bale chamber. The plunger, consisting of members 26, oscillates pendulum fashion about the shaft 20. It operates in synchronized relation to collector-feeder C to strip the crop material delivered from the fingers 4 and force the material into bale chamber B and against the material previously deposited in the chamber. The delivery of the material by the fingers 4 is so timed with the plunger that no back-sliding of material occurs once it has entered the bale chamber. Several relative positions of the feed fingers 4 with respect to head plates 26 of the plunger are shown in Fig. 4, the feed fingers being in locations a, b, or c when head plates 26 are in corresponding positions a', b', or c'. It will be noted that when fingers 4 move from position a to position c, they pass through the plunger head plates 26 moving from position a' to position c'. As a result, the hay is cleanly stripped from the fingers 4 by the plunger.

The top wall of the bale chamber 47, including the forwardly projecting portions 47a, is so disposed relative to the direction of feed of the collector-feeder, that the material is delievered against this wall, the fingers passing between the forwardly projecting portions (Fig. 4). This insures thorough distribution of the material in the bale chamber, and, therefore, the resulting bales are of uniform shape. The bales, as they are formed, move upwardly along inclined floors 32 and 39 and finally onto the inclined bale chute 43. The previously formed bales provide a back-pressure which offers resistance to the incoming hay. Thus, low-density bales are formed.

Figure 3:
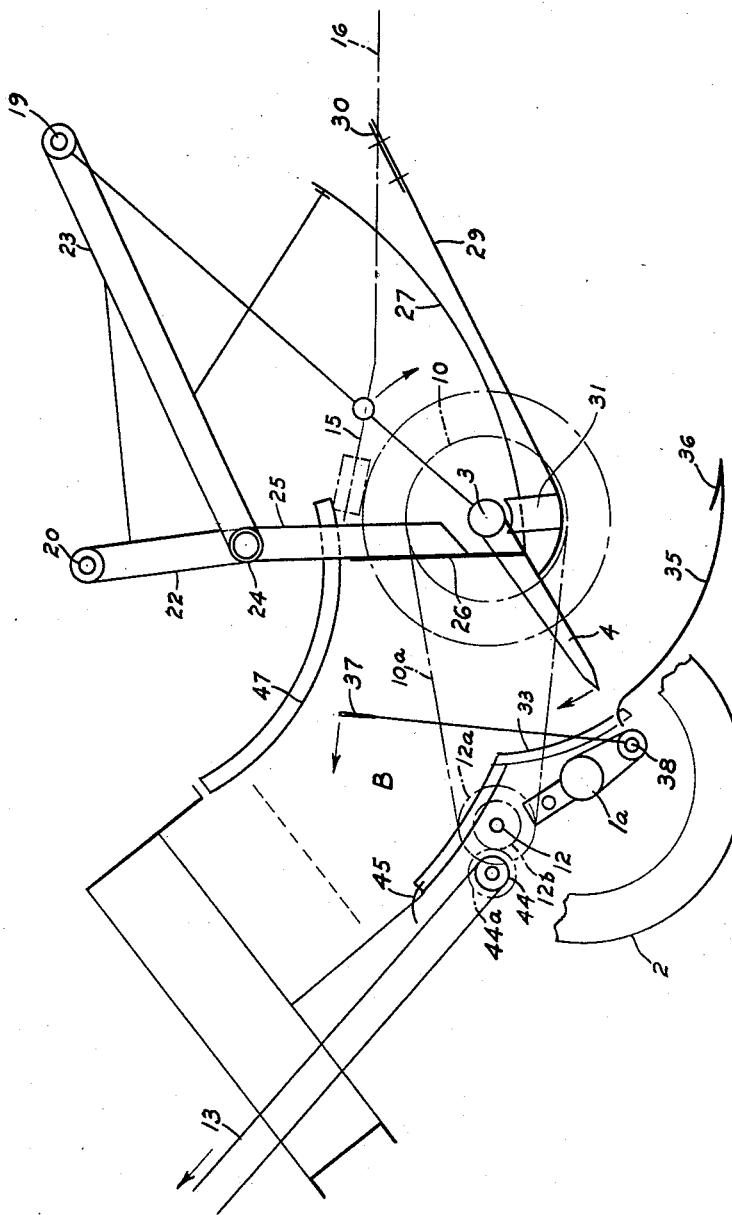
Fig. 3 is a diagrammatic view similar to Fig. 1 showing the baling machine having its tying apparatus removed and provided instead with elevating means.

Referring now to Fig. 1, it will be seen that the floor 39, together with needle shaft 41, needles 42, and chute 43, can be removed and replaced by an elevator 13 (Fig. 3). The tying mechanism and drive to shaft 11 is likewise removed. Elevator 13 may be of any conventional type of endless conveyor being driven from sprocket 10, through endless chain 10a, which was formerly connected to the tying mechanism, through sprocket 12a, to drive shaft 12 and gear 12b meshing with a gear 44a keyed to a shaft 44 for driving the conveyor. With this construction, the material merely passes through bale chamber B and is deposited on the elevator 13 which is adapted to elevate the material and drop it into a trailing wagon. A scraper member 45 may be provided to prevent material from back-sliding on the endless conveyor.

Fig. 3 likewise illustrates the further adaptation of the machine wherein a mower is provided in front of the rake 35, the mower being denoted at 36. It will thus be seen that the machine can be towed through a standing crop so that the mower 36 may cut the crop, rakes 35 elevate it into the collector-feeder C, feeder C delivers it into the bale chamber B, and plunger plates 26 advance it through the bale chamber to elevator 13.

Figure 5:
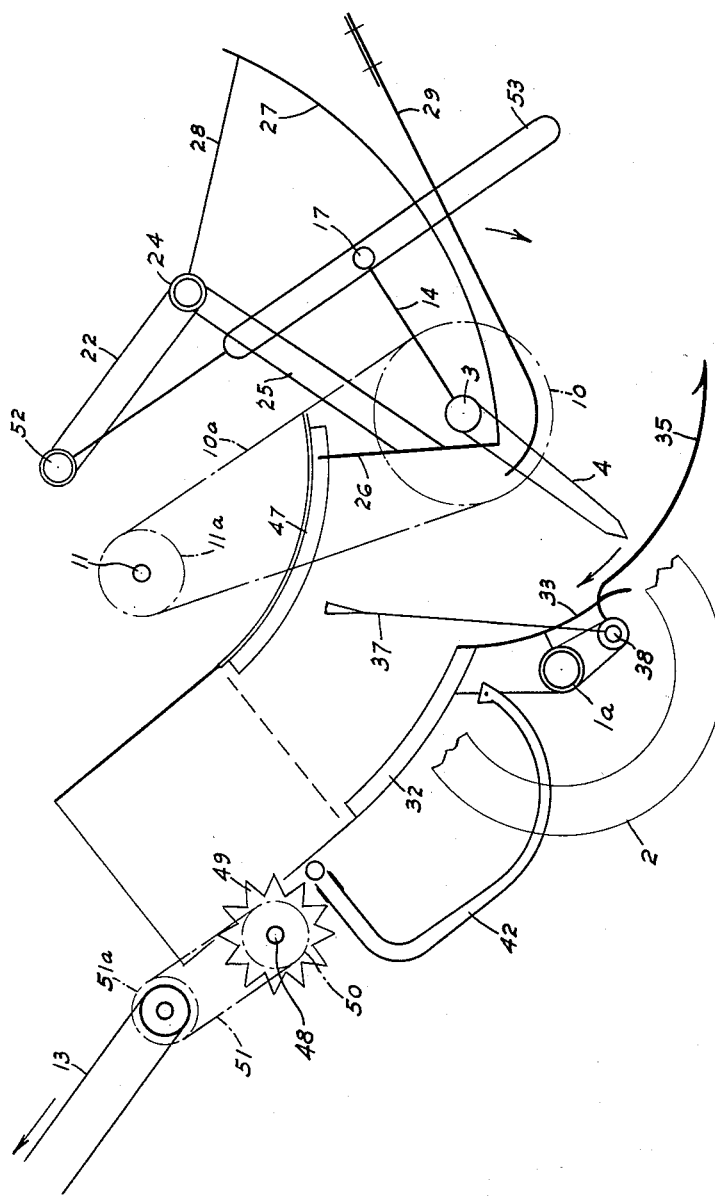

Referring now to the embodiment of the invention shown in Fig. 5, the baler illustrated is the same as that shown in Fig. 1, like parts bearing like numerals. However, in place of bale chute 43, a conveyor means is provided. Bales are delivered from the bale chamber B to a plurality of spaced toothed wheels 49 mounted on a shaft 48. Wheels 49 and shaft 48 are rotated by the bales being forced out of bale chamber B by plunger 26. An endless conveyor 13 is provided, having a sprocket 51a driven by an endless chain 51 from a sprocket 50 keyed to shaft 48. Since the toothed wheels are moved and actuated by the material moving out of the bale chamber, then in the same manner that the material passes intermittently through the chamber, the elevator is intermittently moved.

Fig. 5 also shows the use of a Scotch yoke applied to a plunger drive. Arms 22 and a slotted slider arm 53 are fixed to a tubular shaft 52. Crank pins 17 of cranks 14 and 9 move in the slide arms. The well-known advantage of such drives, namely, slow advance and fast return, are here applied to the baler.

While the invention has been described in connection with several embodiments thereof, it will be understood that it is capable of further modification, and this application is intended to cover any variations, uses, or adaptations of the invention, following in general the principles of the invention and including such departures from the present disclosure as come within known or customary practice in the art in which the invention pertains, and as fall within the scope of the invention or the limits of the appended claims.

Having thus described my invention, what I claim is:

1. A hay baler comprising a mobile frame, a fore-and-aft extending bale chamber mounted on said frame, said bale chamber having a top wall and a floor, said top wall having laterally spaced portions, said floor being spaced from the ground and providing a feed opening through which material may be fed upwardly and into said bale chamber, a plunger reciprocable in said chamber to compress crop material deposited therein, said plunger moving aft and past said opening on a working stroke and forward on a return stroke to a starting position, said plunger comprising a plurality of vertically extending laterally spaced plates, a plurality of laterally spaced arms supporting said plates, a collector-feeder for engaging crop material on the ground, elevating it and feeding the material into said bale chamber through said opening, said collector-feeder comprising a rotatable generally horizontal shaft extending transversely relative to the fore-and-aft extension of said bale chamber, means mounting said shaft on said frame forwardly of said plates and closely adjacent thereto when the plunger is in starting position, the axis of said shaft being above the lower ends of said plates when said plunger is in starting position, at least, a plurality of feed fingers extending radially from said shaft and passable through the spaces between said plates and said arms, the length of said fingers and the vertical position of said shaft being such that on rotation of said shaft in one direction said fingers move upwardly and completely across said bale chamber from said floor to said top wall and then through said laterally spaced top wall portions, and means connected to said shaft and said plunger for rotating the shaft and reciprocating the plunger in timed relation to have said fingers delivering crop material upwardly through said opening while said plunger is moving rearwardly on a working stroke whereby said fingers are stripped of material by said plunger.

2. A hay baler as recited in claim 1 wherein affixed to said plates and extending forwardly therefrom are laterally spaced guard members which substantially block off said bale case opening when said plunger is in extended, rearward position.

3. A hay baler as recited in claim 1 wherein a plurality of downwardly and rearwardly inclined entry guides are provided to direct material toward said feed opening, and means mounting said entry guides on said frame.

References Cited in the file of this patent
UNITED STATES PATENTS

| | | |
|---|---|---|
| 2,633,691 | Lytle | Apr. 7, 1953 |
| 2,725,009 | Bornzin | Nov. 29, 1955 |
| 2,727,458 | Hauswirth et al. | Dec. 20, 1955 |

FOREIGN PATENTS

| | | |
|---|---|---|
| 447,365 | Great Britain | May 18, 1936 |
| 91,500 | Sweden | Feb. 17, 1938 |
| 1,010,983 | France | Apr. 2, 1952 |
| 510,792 | Belgium | May 15, 1952 |
| 924,062 | Germany | Feb. 24, 1955 |